(12) United States Patent
Matsumoto et al.

(10) Patent No.: US 10,314,068 B2
(45) Date of Patent: Jun. 4, 2019

(54) COMMUNICATION CONTROL METHOD AND USER TERMINAL

(71) Applicant: KYOCERA CORPORATION, Kyoto (JP)

(72) Inventors: Naohisa Matsumoto, Kawasaki (JP); Kugo Morita, Yokohama (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/125,389

(22) PCT Filed: Mar. 18, 2015

(86) PCT No.: PCT/JP2015/058064
§ 371 (c)(1),
(2) Date: Sep. 12, 2016

(87) PCT Pub. No.: WO2015/141728
PCT Pub. Date: Sep. 24, 2015

(65) Prior Publication Data
US 2017/0164396 A1 Jun. 8, 2017

(30) Foreign Application Priority Data
Mar. 20, 2014 (JP) .................................. 2014-059273

(51) Int. Cl.
*H04W 72/12* (2009.01)
*H04W 72/02* (2009.01)
(Continued)

(52) U.S. Cl.
CPC ....... *H04W 72/1278* (2013.01); *H04L 1/0015* (2013.01); *H04L 1/1887* (2013.01);
(Continued)

(58) Field of Classification Search
CPC ............... H04L 1/0015; H04L 1/1887; H04W 72/1278; H04W 76/023; H04W 92/18
See application file for complete search history.

(56) References Cited

U.S. PATENT DOCUMENTS

| 2011/0044230 A1 | 2/2011 | Morimoto et al. |
| 2012/0195292 A1* | 8/2012 | Ko .................. H04L 1/0027 370/336 |

(Continued)

FOREIGN PATENT DOCUMENTS

| JP | H08-195709 A | 7/1996 |
| JP | 2009-212598 A | 9/2009 |

OTHER PUBLICATIONS

English Translation, JP,08-195709,A; Jul. 1996; Kondo Yasushi (Year: 1996).*

(Continued)

*Primary Examiner* — Khaled M Kassim
(74) *Attorney, Agent, or Firm* — Studebaker & Brackett PC (57) ABSTRACT

In the communication control method according to the present embodiment, a user terminal transmits a scheduling assignment indicating the location of a radio resource used in a reception of communication data by direct device-to-device communication. The user terminal transmits the communication data including initial transmission data and retransmission data by using the radio resource. The retransmission data is transmitted depending on the number of times of re-transmissions associated with a predetermined scheduling assignment by using a predetermined radio resource of which the location is indicated by the predetermined scheduling assignment.

3 Claims, 9 Drawing Sheets

(51) Int. Cl.
   H04L 5/00      (2006.01)
   H04W 76/14     (2018.01)
   H04L 1/00      (2006.01)
   H04L 1/18      (2006.01)
   H04W 92/18     (2009.01)

(52) U.S. Cl.
   CPC .......... H04L 5/0044 (2013.01); H04L 5/0094 (2013.01); H04W 72/02 (2013.01); H04W 76/14 (2018.02); H04L 5/0096 (2013.01); H04W 92/18 (2013.01)

(56) References Cited

U.S. PATENT DOCUMENTS

| | | | |
|---|---|---|---|
| 2014/0050191 A1* | 2/2014 | Kim | H04L 5/001 370/329 |
| 2014/0057637 A1* | 2/2014 | Hoang | H04W 56/0045 455/445 |
| 2014/0105158 A1* | 4/2014 | Kim | H04W 72/042 370/329 |
| 2014/0105191 A1* | 4/2014 | Yang | H04L 1/1867 370/336 |
| 2014/0177540 A1* | 6/2014 | Novak | H04W 72/042 370/329 |
| 2014/0177542 A1* | 6/2014 | Novak | H04W 72/042 370/329 |
| 2014/0241262 A1* | 8/2014 | Novak | H04W 72/042 370/329 |
| 2015/0110038 A1* | 4/2015 | Yang | H04W 72/042 370/329 |
| 2015/0271840 A1* | 9/2015 | Tavildar | H04L 1/08 370/329 |
| 2016/0173239 A1* | 6/2016 | Kim | H04L 1/1812 370/329 |
| 2016/0183276 A1* | 6/2016 | Marinier | H04W 72/02 370/329 |
| 2016/0249355 A1* | 8/2016 | Chae | H04W 72/1263 |

OTHER PUBLICATIONS

International Search Report issued in PCT/JP2015/058064; dated Jun. 23, 2015.
Written Opinion issued in PCT/JP2015/058064; dated Jun. 23, 2015.
3rd Generation Partnership Project; Technical Specification Group RAN; Study on LTE Device to Device Proximity Services—Radio Aspects; 3GPP TR 36.843 V1.0.0; Nov. 2013; pp. 1-32; Release 12; 3GPP Organizational Partners.
Ericsson; D2D Physical Channels Design; 3GPP TSG RAN WG1 Meeting #76; R1-140776; Feb. 10-14, 2014; pp. 1-9; Prague, Czech Republic.
Qualcomm incorporated; Control for D2D broadcast communication; 3GPP TSG-RAN WG1 #76; R1-140466; Feb. 10-14, 2014; pp. 1-4; Prague, Czech Republic.
CATR; On control information of D2D communication; 3GPP TSG RAN WG1 Meeting #76; R1-140662; Feb. 10-14, 2014; pp. 1-2; Prague, Czech Republic.
Kyocera; Design details of scheduling assignments; 3GPP TSG RAN WG1 Meeting #77; R1-142480; May 19-23, 2014; pp. 1-5; Seoul, Republic of Korea.
Supplementary European Search Report issued by the European Patent Office on Oct. 9, 2017, which corresponds to EP15765995.4-1875 and is related to U.S. Appl. No. 15/125,389.
Ericsson, "D2D Scheduling Procedure", 3GPP TSG-RAN WG2 #84, R2-134238, San Francisco, USA, Nov. 11-15, 2013, pp. 1-7.
Ericsson, "EUL coverage enhancements", 3GPP TSG-RAN WG1 #52bis, R1-081619, Shenzhen, China, Mar. 31-Apr. 4, 2008, pp. 1-5.

* cited by examiner

| CONTENT OF SA | Bits |
|---|---|
| Tx UE ID | 16 bits |
| MCS | 5 bits |

| CONTROL INFORMATION ACCOMPANYING DATA | Bits |
|---|---|
| NO | NO |

FIG. 9

| CONTENT OF SA | Bits |
|---|---|
| Tx UE ID | 16 bits |
| MCS | 5 bits |
| NUMBER OF TIMES OF RE-TRANSMISSIONS | 3 bits |

| CONTROL INFORMATION ACCOMPANYING DATA | Bits |
|---|---|
| RV | 2 bits |

| CONTENT OF SA | Bits |
|---|---|
| Tx UE ID | 16 bits |
| MCS | 5 bits |

| CONTROL INFORMATION ACCOMPANYING DATA | Bits |
|---|---|
| NDI | 1 bits |

COMMUNICATION CONTROL METHOD AND USER TERMINAL

TECHNICAL FIELD

The present invention relates to a communication control method and a user terminal used in a mobile communication system.

BACKGROUND ART

In 3GPP (3rd Generation Partnership Project) which is a project aiming to standardize a mobile communication system, the introduction of a Device to Device (D2D) proximity service is discussed as a new function in Release 12 and later (see Non Patent Document 1).

The D2D proximity service (D2D ProSe) is a service enabling direct device-to-device communication within a synchronization cluster formed by a plurality of synchronized user terminals. The D2D proximity service includes a D2D discovery procedure (Discovery) in which a proximal terminal is discovered, and D2D communication (Communication) that is direct device-to-device communication.

PRIOR ART DOCUMENT

Non-Patent Document

Non Patent Document 1: 3GPP technical report "TR 36.843 V1.0.0" Mar. 10, 2014

SUMMARY

In a communication control method according to one embodiment, a user terminal transmits a scheduling assignment indicating a location of a radio resource used in a reception of communication data by direct device-to-device communication. The user terminal transmits the communication data including initial transmission data and retransmission data by using the radio resource. The retransmission data is transmitted depending on a number of times of re-transmissions associated with a predetermined scheduling assignment by using a predetermined radio resource of which a location is indicated by the predetermined scheduling assignment.

In a communication control method according to one embodiment, a user terminal transmits a scheduling assignment indicating a location of a radio resource used in a reception of communication data by direct device-to-device communication. The user terminal transmits the communication data including initial transmission data and retransmission data by using the radio resource. The user terminal transmits, upon transmitting the communication data, a new data identifier indicating switching from a predetermined retransmission data to a next initial transmission data together with the initial transmission data or the retransmission data by using each of a plurality of small resources included in the radio resource.

A user terminal according to one embodiment comprises: a transmitter configured to transmit a scheduling assignment indicating a location of a radio resource used in a reception of communication data by direct device-to-device communication. The transmitter transmits the communication data including initial transmission data and retransmission data by using the radio resource. The retransmission data is transmitted depending on a number of times of re-transmissions associated with a predetermined scheduling assignment by using a predetermined radio resource of which a location is indicated by the predetermined scheduling assignment.

A user terminal according to one embodiment comprises: a transmitter configured to transmit a scheduling assignment indicating a location of a radio resource used in a reception of communication data by direct device-to-device communication. The transmitter transmits the communication data including initial transmission data and retransmission data by using the radio resource. The transmitter transmits, upon transmitting the communication data, a new data identifier indicating switching from a predetermined retransmission data to a next initial transmission data together with the initial transmission data or the retransmission data by using each of a plurality of small resources included in the radio resource.

DESCRIPTION OF THE EMBODIMENT

[Overview of Embodiments]

In a case where D2D communication is performed by the transmission of D2D communication data by broadcast by a transmission-side user terminal, it is assumed that a reliability of the D2D communication is improved by performing a Blind HARQ in which the transmission-side user terminal decides the number of times of re-transmissions of retransmission data, independent of a feedback from a reception-side user terminal that receives the D2D communication data.

However, since there is no mechanism of applying a Blind HARQ to the D2D communication, it is feared that the reception-side user terminal does not understand whether the received D2D communication data is initial transmission data or retransmission data until the contents of the received D2D communication data are checked.

Therefore, an object of an embodiment is to enable a reception-side user terminal to appropriately understand initial transmission data and retransmission data, when a transmission-side user terminal decides the number of times of re-transmissions of retransmission data, independent of a feedback from the reception-side user terminal.

In a communication control method according to embodiments, a user terminal transmits a scheduling assignment indicating a location of a radio resource used in a reception of communication data by direct device-to-device communication. The user terminal transmits the communication data including initial transmission data and retransmission data by using the radio resource. The retransmission data is transmitted depending on a number of times of re-transmissions associated with a predetermined scheduling assignment by using a predetermined radio resource of which a location is indicated by the predetermined scheduling assignment.

In the embodiments, the user terminal transmits the predetermined scheduling assignment including re-transmissions-number-of-times information indicating the number of times of re-transmissions, when transmitting a plurality of initial transmission data by using the predetermined radio resource.

In the embodiments, the user terminal receives the communication data including initial transmission data and retransmission data from another user terminal. The user terminal decides the number of times of re-transmissions on the basis of a reception status of the communication data received from the another user terminal.

In the embodiments, when a reception success rate of the communication data indicating the reception status of the communication data received from the another user terminal is below a threshold value, the user terminal decides a value larger than a number of times of re-transmissions of retransmission data that is transmitted from the another user terminal as the number of times of re-transmissions.

In the embodiments, when a reception success rate of the communication data indicating the reception status of the communication data received from the another user terminal is higher than a threshold value, the user terminal decides a value lower than a number of times of re-transmissions of retransmission data that is transmitted from the another user terminal as the number of times of re-transmissions.

In the embodiments, the user terminal decides a modulation and coding scheme to be applied to the communication data transmitted by the user terminal after deciding the number of times of re-transmissions.

In a communication control method according to the embodiments, a user terminal transmits a scheduling assignment indicating a location of a radio resource used in a reception of communication data by direct device-to-device communication. The user terminal transmits the communication data including initial transmission data and retransmission data by using the radio resource. The user terminal transmits, upon transmitting the communication data, a new data identifier indicating switching from a predetermined retransmission data to a next initial transmission data together with the initial transmission data or the retransmission data by using each of a plurality of small resources included in the radio resource.

In the embodiments the user terminal transmits, as the scheduling assignment, a first scheduling assignment and a second scheduling assignment that is transmitted after the first scheduling assignment. The user terminal transmits the communication data including the initial transmission data and the retransmission data by using at least a last small resource of a first plurality of small resources of which a location is indicated by the first scheduling assignment, and at least an initial small resource of a second plurality of small resources of which a location is indicated by the second scheduling assignment.

In the embodiments, the user terminal receives communication data by direct device-to-device communication that includes initial transmission data and retransmission data from another user terminal. The user terminal decides a number of times of re-transmissions of the retransmission data on the basis of a reception status of the communication data received from the another user terminal.

In the embodiments, when a reception success rate of the communication data indicating the reception status of the communication data received from the another user terminal is below a threshold value, the user terminal decides a value larger than a number of times of re-transmissions of retransmission data from the another user terminal as the number of times of re-transmissions of the retransmission data transmitted by the user terminal.

In the embodiments, when a reception success rate of the communication data indicating the reception status of the communication data received from the another user terminal is higher than a threshold value, the user terminal decides a value lower than a number of times of re-transmissions of retransmission data from the another user terminal as the number of times of re-transmissions of the retransmission data transmitted by the user terminal.

In the embodiments, the user terminal decides a modulation and coding scheme to be applied to the communication data transmitted by the user terminal after deciding the number of times of re-transmissions of the retransmission data transmitted by the user terminal.

A user terminal according to the embodiments comprises: a transmitter configured to transmit a scheduling assignment indicating a location of a radio resource used in a reception of communication data by direct device-to-device communication. The transmitter transmits the communication data including initial transmission data and retransmission data by using the radio resource. The retransmission data is transmitted depending on a number of times of re-transmissions associated with a predetermined scheduling assignment by using a predetermined radio resource of which a location is indicated by the predetermined scheduling assignment.

A user terminal according to the embodiments comprises: a transmitter configured to transmit a scheduling assignment indicating a location of a radio resource used in a reception of communication data by direct device-to-device communication. The transmitter transmits the communication data including initial transmission data and retransmission data by using the radio resource. The transmitter transmits, upon transmitting the communication data, a new data identifier indicating switching from a predetermined retransmission data to a next initial transmission data together with the initial transmission data or the retransmission data by using each of a plurality of small resources included in the radio resource.

[Embodiment]

An embodiment of applying the present invention to a LTE system will be described below.

(System Configuration)

Figure 1:
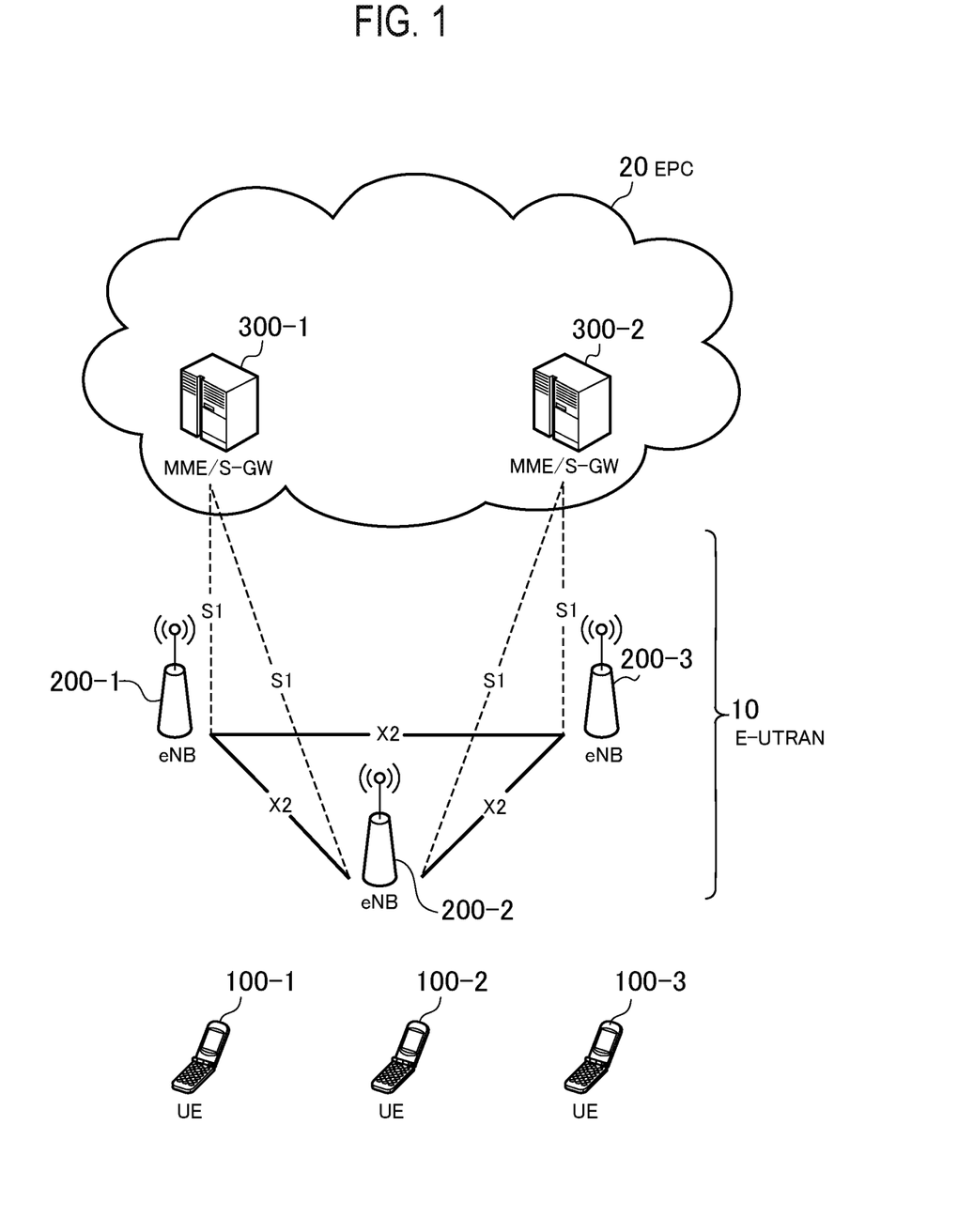
FIG. 1 is a configuration diagram of an LTE system according to an embodiment.

FIG. 1 is a configuration diagram of the LTE system according to the embodiment. As illustrated in FIG. 1, the LTE system according to the embodiment includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell) with which a connection is established. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The network of the LTE system (LTE network) is constituted by the E-UTRAN 10 and the EPC 20. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

Figure 2:
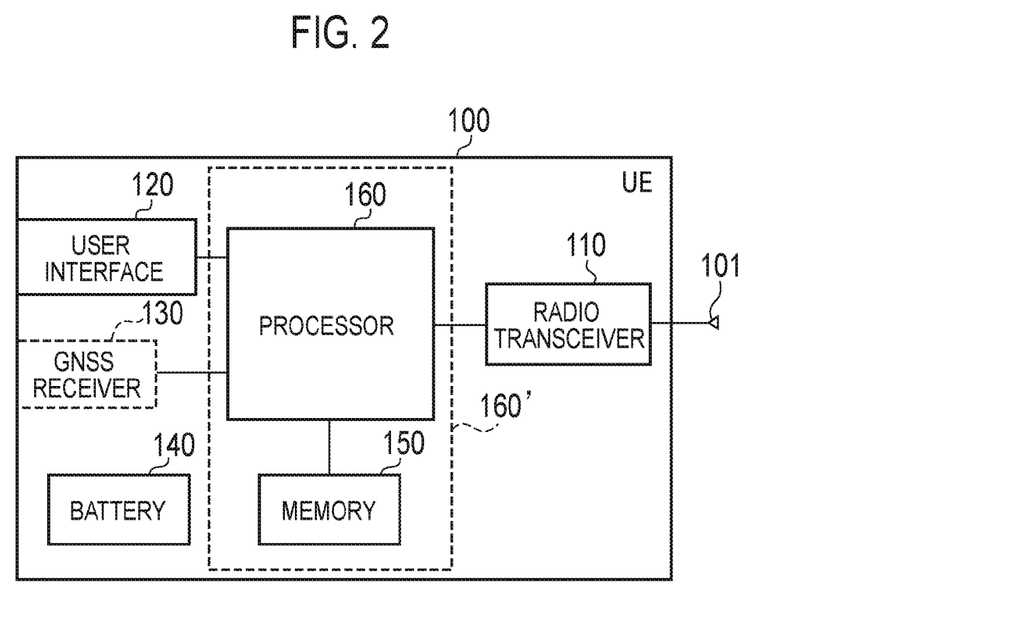
FIG. 2 is a block diagram of a UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds to a storage and the processor 160 corresponds to a controller. The UE 100 may not have the GNSS receiver 130. Furthermore, the memory 150 may be integrally formed with the processor 160, and this set (that is, a chip set) may be called a processor 160' which constitutes the controller.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
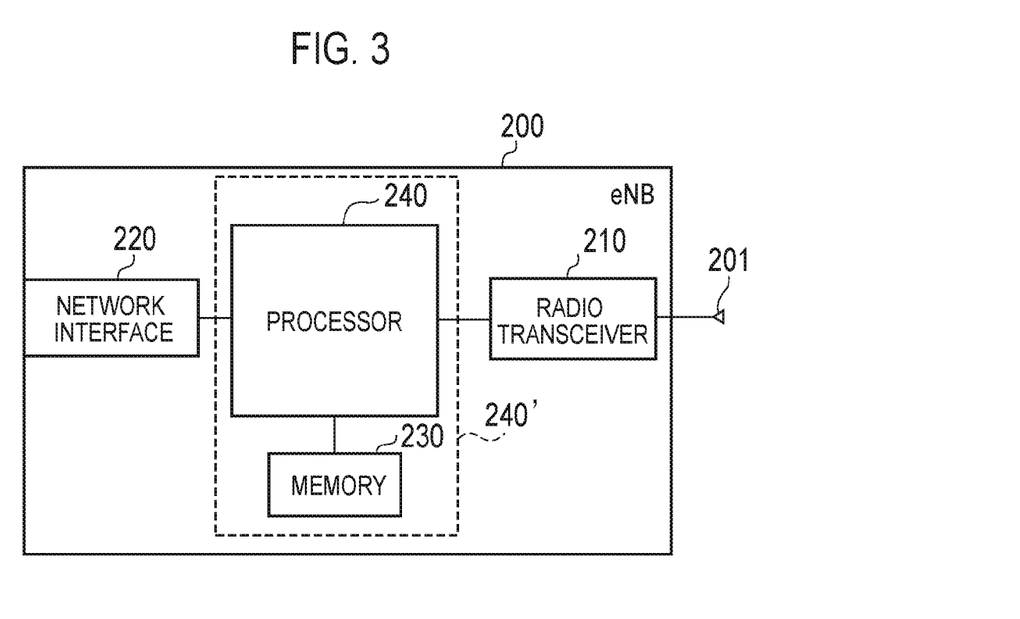
FIG. 3 is a block diagram of an eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240. Further, the memory 230 may be integrally formed with the processor 240, and this set (that is, a chipset) may be called a processor 240' which constitute the controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
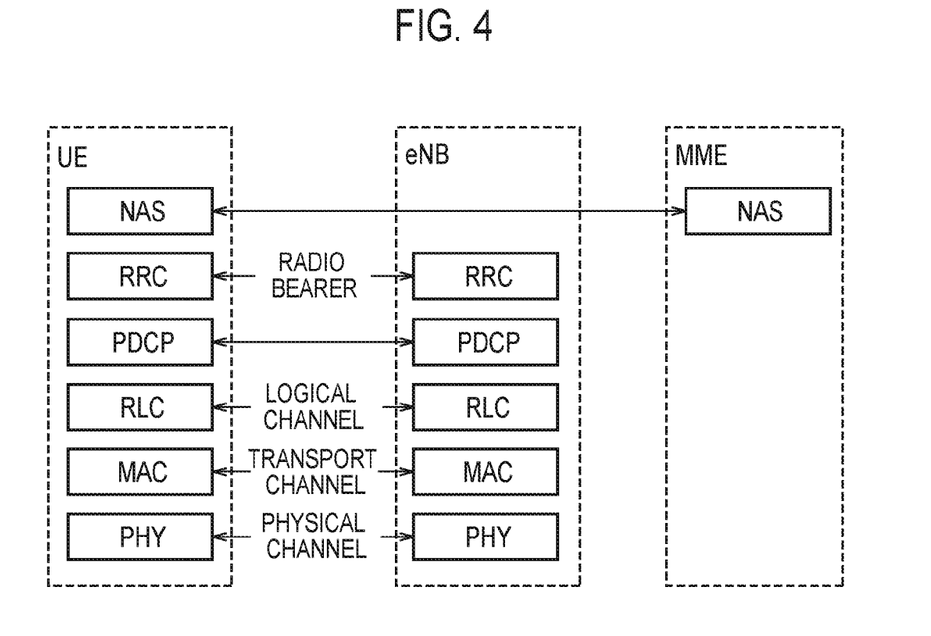
FIG. 4 is a protocol stack diagram according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), a random access procedure at the time of RRC connection establishment and the like. Between the MAC layer of the UE 100 and the MAC layer of the eNB 200, user data and control signal are transmitted via a transport channel. The MAC layer of the eNB 200 includes a scheduler that determines (schedules) a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control signal (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 5:
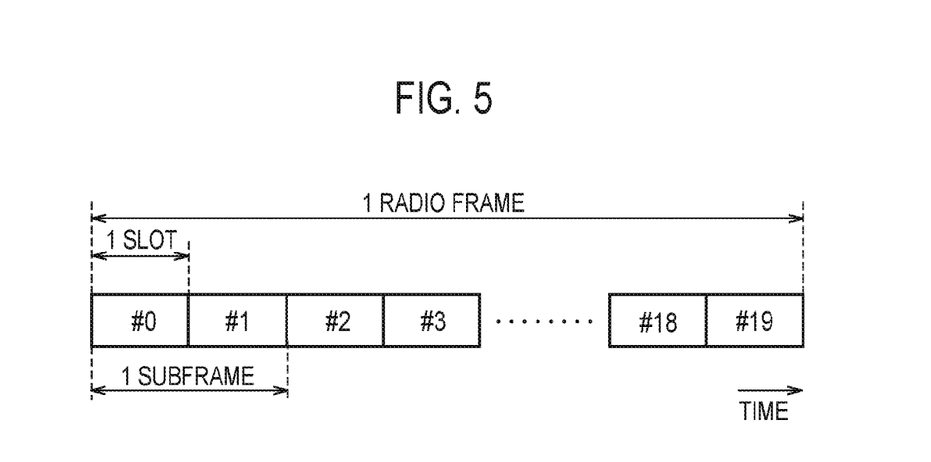
FIG. 5 is a configuration diagram of a radio frame according to the embodiment.

FIG. 5 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

Figure 6:
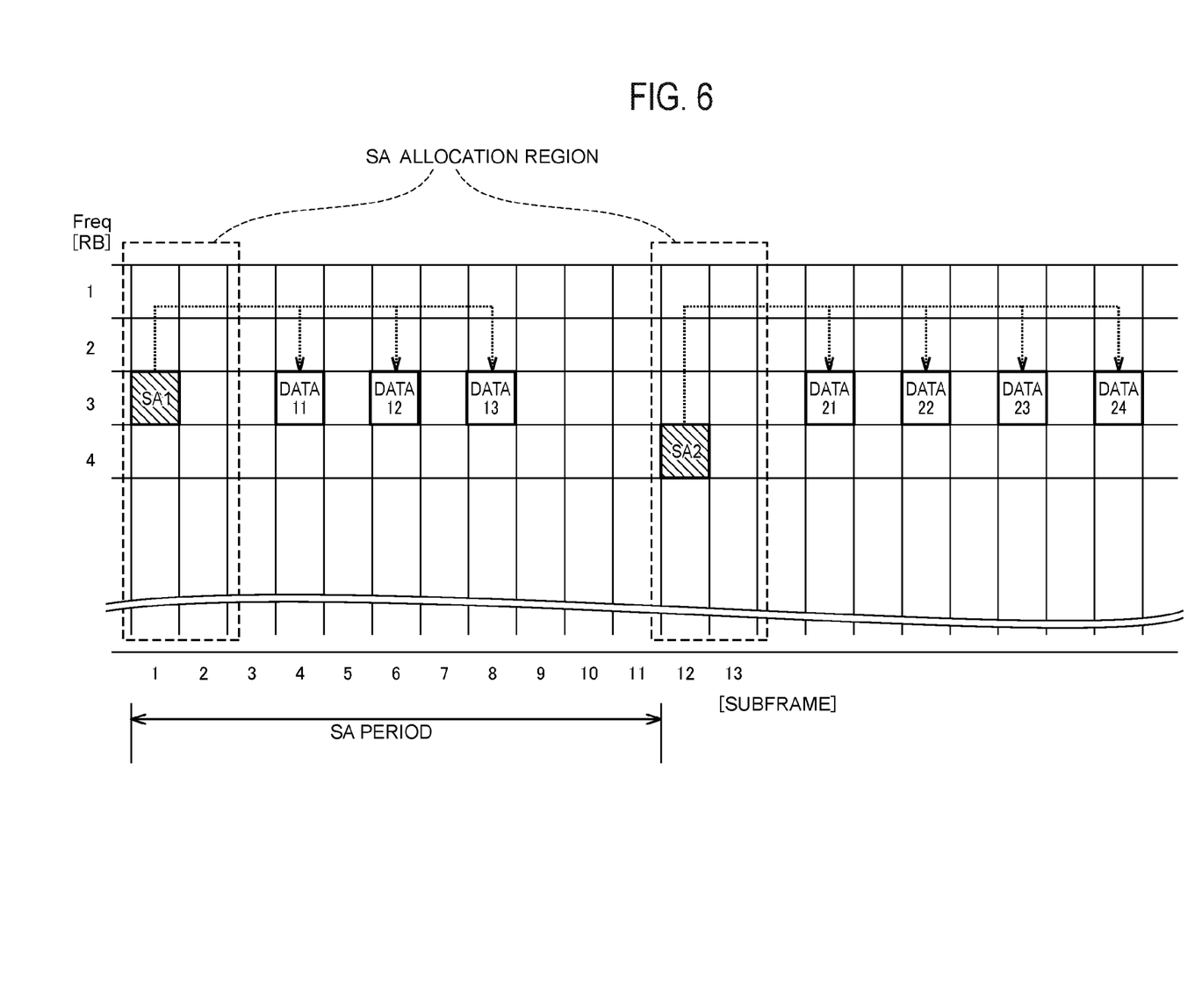
FIG. 6 is a diagram for describing a scheduling assignment according to the embodiment.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. A resource element is constituted by one subframe and one symbol. Among radio resources (time-frequency resources) assigned to the UE 100, a frequency resource is constituted by a resource block and a time resource is constituted by a subframe (or slot).

(D2D Proximity Service)

A D2D proximity service will be described, below. The LTE system according to the embodiment supports the D2D proximity service. The D2D proximity service is described in Non Patent Document 1, and an outline thereof will be described here.

The D2D proximity service (D2D ProSe) is a service enabling direct UE-to-UE communication within a synchronization cluster formed by a plurality of synchronized UEs 100. The D2D proximity service includes a D2D discovery procedure (Discovery) in which a proximal UE is discovered and, D2D communication (Communication) that is direct UE-to-UE communication. The D2D communication is also called Direct communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

In "In coverage", the eNB 200 is a D2D synchronization source, for example. A D2D asynchronization source is synchronized with the D2D synchronization source without transmitting a D2D synchronization signal. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in a D2D synchronization procedure in which device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information is conveyed than the D2DSS. The PD2DSCH conveys the above-described D2D resource information (Discovery resource information, Communication resource information). Alternatively, when the D2DSS is associated with the D2D resource information, the PD2DSCH may be rendered unnecessary.

The D2D discovery procedure is used mainly when the D2D communication is performed by unicast. One UE 100 uses any particular radio resource out of radio resources available for the D2D discovery procedure when starting the D2D communication with another UE 100 to transmit a Discovery signal. The another UE 100 scans the Discovery signal within the radio resource available for the D2D discovery procedure when starting the D2D communication with the one UE 100 to receive the Discovery signal. The Discovery signal may include information indicating a radio resource used by the one UE 100 for the D2D communication.

(Scheduling Assignment)

A scheduling assignment (SA) will be described below by using FIG. 6. FIG. 6 is a diagram for describing the scheduling assignment according to the embodiment.

The UE 100 transmits a scheduling assignment when performing D2D broadcast communication in which a transmission destination is not specified. Specifically, the UE 100 transmits a scheduling assignment by using a radio resource from a periodically arranged SA allocation region. A part of the D2D resource pool for the D2D communication data is set as a resource pool for the SA allocation region. A period from one SA allocation region up to before the next SA allocation region is one SA cycle.

Here, the scheduling assignment indicates a location of a radio resource for the reception of the D2D communication data (hereinafter, appropriately called a D2D data resource). Specifically, as shown in FIG. 6, the scheduling assignment SA1 indicates locations of radio resources used in the D2D communication data DATA 11, DATA 12, and DATA 13. The scheduling assignment preferably indicates the location of a plurality of D2D data resources. The scheduling assignment preferably indicates the location of the D2D data resources on the basis of the location of the scheduling assignment. As a result, it is possible to reduce the number of bits for indicating the location of the D2D data resources. For example, when the scheduling assignment specifies a D2D data resource like "UL resource allocation type 0" of "DCI format 0", a maximum of 13 bits are necessary for assignment in a frequency direction, but by indicating the location of the D2D data resource on the basis of the location of the scheduling assignment, it is possible to reduce the number of bits to be less than 13 bits.

In order to indicate the location of the D2D data resource on the basis of the location of the scheduling assignment, for example, it is preferable to fix an offset from the location of the scheduling assignment up to the location of the D2D data resource, and fix an interval of each D2D data resource for which one scheduling assignment indicates the location, and also fix a width (RB width) of the D2D data resource in the frequency direction. For example, the width of the D2D data resource in the frequency direction may be fixed to the width of two resource blocks.

It is preferable to code the scheduling assignment by using a Tailbiting convolutional code (TBCC) rather than a turbo code. This is because when the TBCC has a smaller bit size than the turbo code, the linking performance is expected to be good. Another reason is that TBCC is used for coding a PDCCH (DCI) as well.

(Operation According to Embodiment)

Next, operation patterns 1 and 2 according to the embodiment will be described.

(A) Operation Pattern 1

Figure 7:
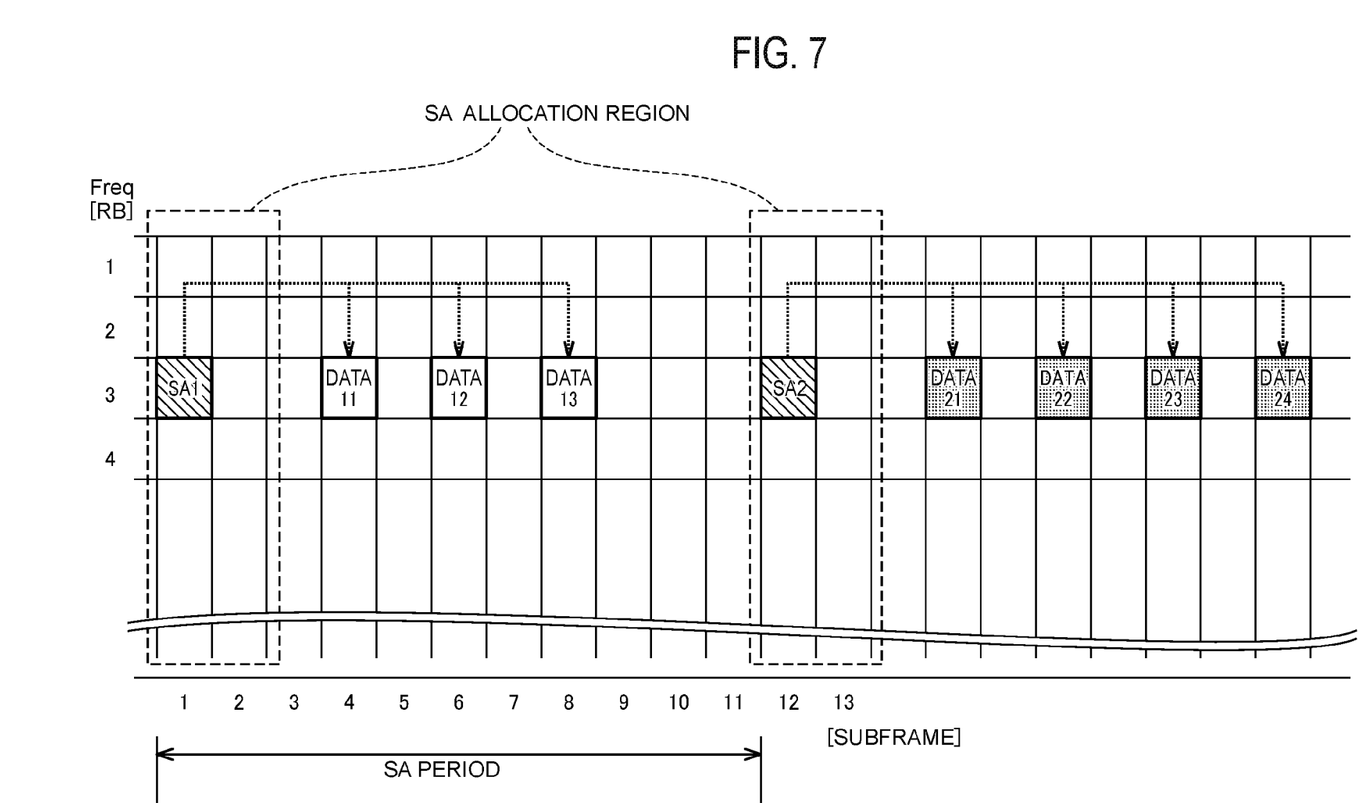
FIG. 7 is a diagram for describing an operation pattern 4 according to the embodiment.
Figure 8:
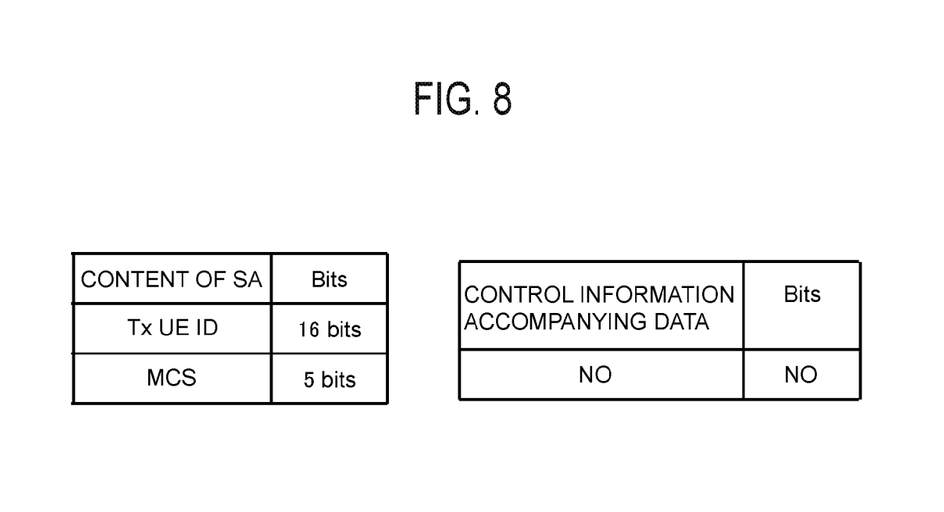
FIG. 8 is a diagram showing an example of contents of a scheduling assignment, and control information accompanying D2D communication data, according to an operation pattern 1 of the embodiment.
Figure 9:
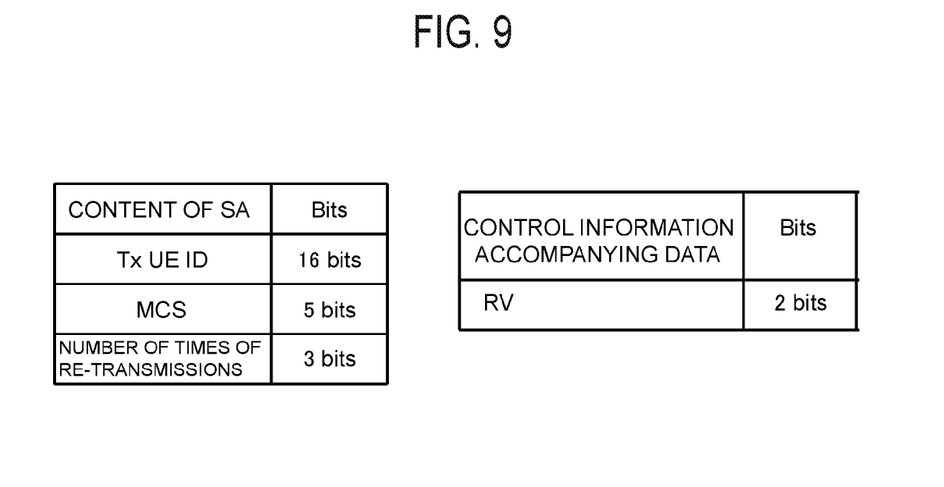
FIG. 9 is a diagram showing an example of contents of a scheduling assignment, and control information accompanying D2D communication data, according to an operation pattern 1 of the embodiment.

The operation pattern 1 will be described by using FIG. 7 through FIG. 9. FIG. 7 is an explanatory diagram for describing the operation pattern 1 according to the embodiment. FIG. 8 and FIG. 9 are diagrams showing an example of the contents of a scheduling assignment, and control information accompanying the D2D communication data, according to the operation pattern 1 of the embodiment.

The operation pattern 1 is a case where the number of times of re-transmissions of retransmission data is possible to be changed for each scheduling assignment.

The UE 100 retransmits the retransmission data by a Blind HARQ in which the UE 100 itself decides the number of times of re-transmissions (HARQ frequency) of the retransmission data. Therefore, before transmitting a scheduling assignment, the UE 100 decides the number of times of re-transmissions of the retransmission data to be transmitted by using a radio resource (D2D data resource) of which the location is indicated by the scheduling assignment. The UE 100 is capable of deciding the number of times of re-transmissions by a method described below.

Here, in the operation pattern 1, the number of times of re-transmissions in one SA cycle is the same. Therefore, the UE 100 associates a scheduling assignment SA 1 and the decided number of times of re-transmissions. Hereinafter, the description proceeds on the assumption that the UE 100 decides the number of times of re-transmissions as two.

As shown in FIG. 7, the UE 100 transmits the scheduling assignment SA 1.

Thereafter, the UE 100 transmits D2D communication data (DATA 11 to 13) including initial transmission data and retransmission data, by using a D2D data resource of which the location is indicated by the scheduling assignment SA 1. The UE 100 transmits the retransmission data depending on the number of times of re-transmissions associated with the scheduling assignment SA 1. In the present embodiment, the DATA 11 is the initial transmission data, and the DATA 12 and the DATA 13 are the retransmission data.

The UE 100 is capable of changing the number of times of re-transmissions of the retransmission data for each scheduling assignment. Therefore, when the UE 100 associates a scheduling assignment SA 2 with three re-transmissions, then as shown in FIG. 7, the UE 100 is capable of transmitting the initial transmission data (DATA 21) and the retransmission data (DATA 22 to 24) as the D2D communication data.

Next, the contents of the scheduling assignment, and control information accompanying the D2D communication data, according to the operation pattern 1 will be described by using FIG. 8 and FIG. 9.

In a case where one initial transmission data, rather than a plurality of initial transmission data, is transmitted by using a D2D data resource of which the location is indicated by one scheduling assignment, the scheduling assignment includes an identifier of a transmission-source UE (Tx UE ID) of the scheduling assignment, and a modulation and coding scheme (MCS) applicable to the D2D communication data. It is noted that the scheduling assignment may include information indicating the location of the D2D data resource, or may not include the information when the location of the D2D communication data is indicated by the location of the scheduling assignment. Further, the control information accompanying the D2D communication data may not be included. In this case, the UE 100 handles a redundant version (RV) as an RV of a predetermined pattern. Alternatively, the UE 100 does not change the RV.

On the other hand, in a case where a plurality of initial transmission data is transmitted by using a D2D data resource of which the location is indicated by one scheduling assignment, the scheduling assignment includes information about the number of times of re-transmissions in addition to the Tx UE ID and the MCS, as shown in FIG. 9. Further, an RV (RV indicator) exists as the control information accompanying the D2D communication data. The RV indicator is assigned automatically depending on the number of times of re-transmissions.

It is noted that in a case where one initial transmission data is transmitted by using a D2D data resource of which the location is indicated by one scheduling assignment, since only the retransmission data is transmitted other than the initial transmission data by using the D2D data resource, it is possible to assume the number of times of re-transmissions from the number of D2D data resources, and therefore, the UE 100 is capable of omitting the inclusion of the information about the number of times of re-transmissions into the scheduling assignment.

According to the operation pattern 1, since the number of times of re-transmissions of the retransmission data is decided for each scheduling assignment, when a plurality of initial transmission data is to be transmitted by using a predetermined D2D data resource of which the location is indicated by a predetermined scheduling assignment, the number of times of re-transmissions of each retransmission data of the plurality of initial transmission data becomes the same. Therefore, by calculating the number of times of re-transmissions of the predetermined initial transmission data, the UE 100 that has received the scheduling assignment is capable of understanding the number of times of re-transmissions of other initial transmission data that is transmitted by using a D2D data resource of which the location is indicated by the same scheduling assignment.

(B) Operation Pattern 2

Figure 10:
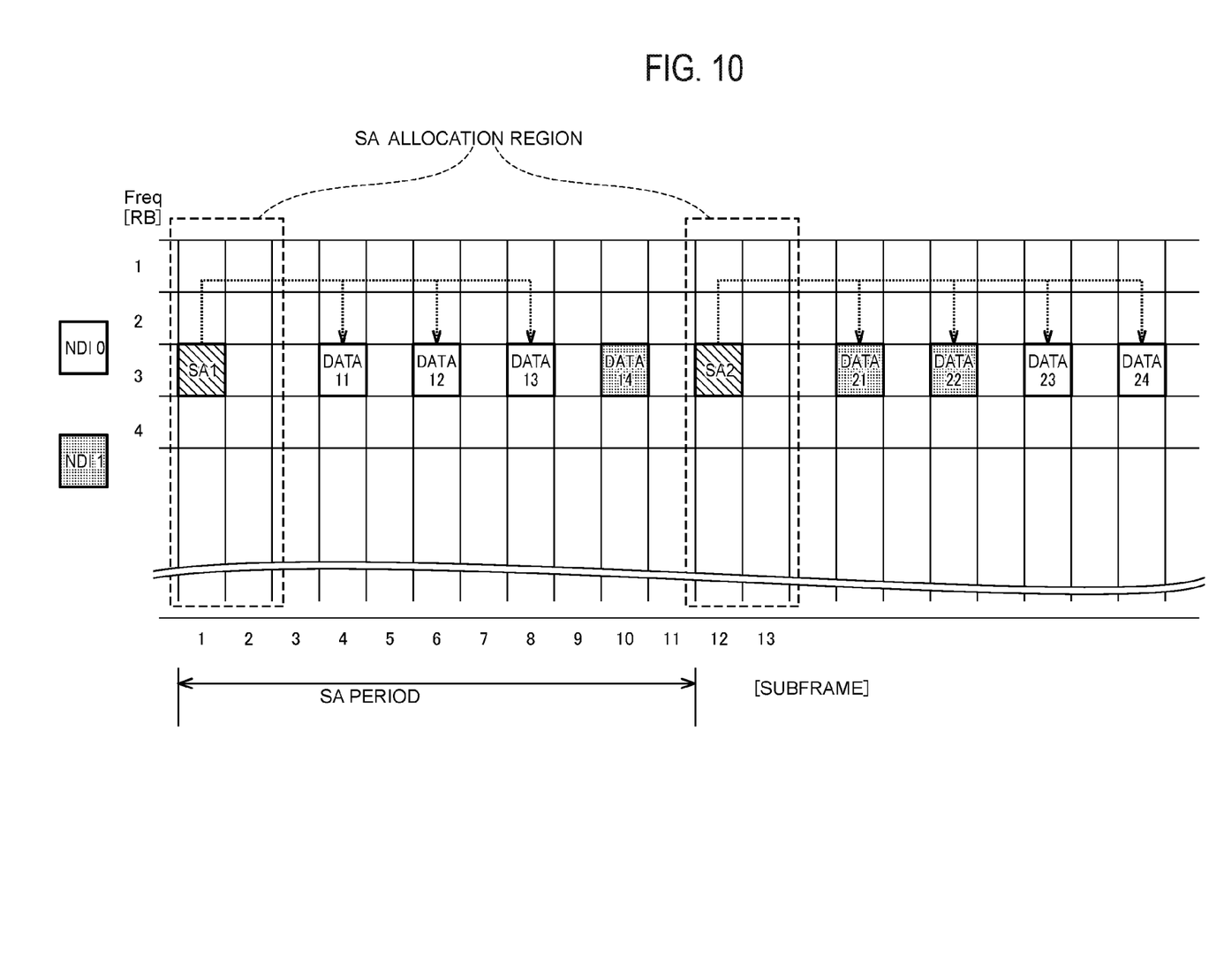
FIG. 10 is an explanatory diagram for describing an operation pattern 2 according to the embodiment.
Figure 11:
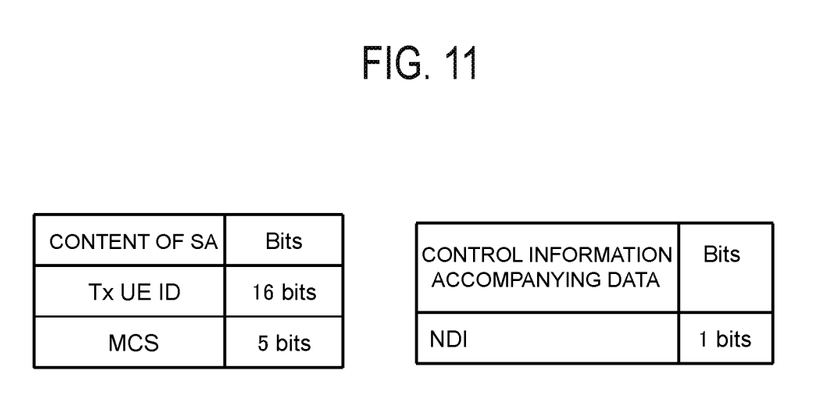
FIG. 11 is a diagram showing an example of contents of a scheduling assignment, and control information accompanying D2D communication data, according to an operation pattern 2 of the embodiment.
Figure 12:
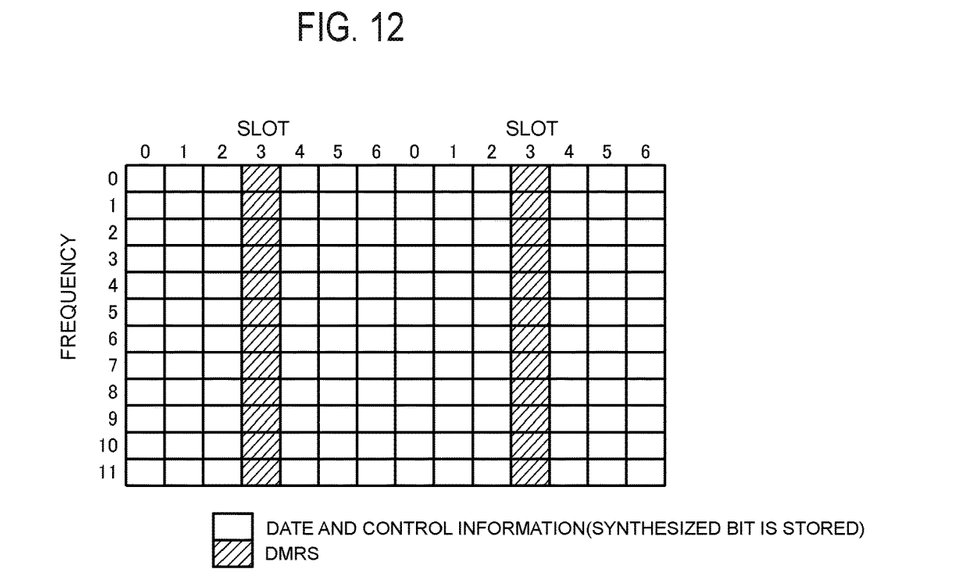
FIG. 12 is a diagram for describing a method of simultaneously transmitting the D2D communication data and a new data identifier according to the embodiment.
Figure 13:
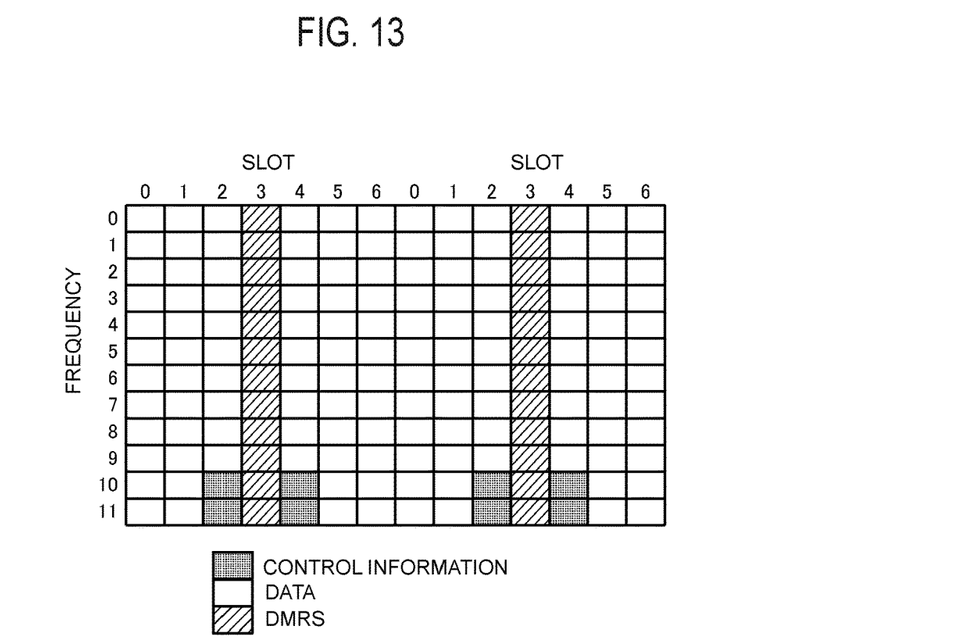
FIG. 13 is a diagram for describing a method of simultaneously transmitting the D2D communication data and a new data identifier according to the embodiment.

The operation pattern 2 will be described by using FIG. 10 through FIG. 12. FIG. 10 is an explanatory diagram for describing the operation pattern 2 according to the embodiment. FIG. 11 is a diagram showing an example of contents of a scheduling assignment, and control information accompanying D2D communication data, according to the operation pattern 2 of the embodiment. FIG. 12 and FIG. 13 are diagrams for describing a method of simultaneously transmitting the D2D communication data and a new data identifier according to the embodiment.

The operation pattern 2 is a case where a scheduling assignment and the number of times of re-transmissions are not associated as in the operation pattern 1. Therefore, the operation pattern 2 is a case where the number of times of re-transmissions of the retransmission data is possible to be changed for each initial transmission data.

As shown in FIG. 10, the UE 100 transmits a scheduling assignment SA 1. Here, the scheduling assignment SA 1 indicates the location of four small resources included in the D2D data resource.

As shown in FIG. 11, the scheduling assignment SA 1 includes a TX UE ID and an MCS, similarly to the above-described operation pattern 1. The scheduling assignment SA 1 includes information indicating the location of a radio resource. Alternatively, when the location of the D2D communication data is indicated by the location of a scheduling assignment, the information may not be included.

On the other hand, the UE 100 decides the number of times of re-transmissions of the retransmission data. Specifically, the UE 100 decides the number of times of re-transmissions of the retransmission data of DATA 11, which is initial transmission data. Here, it is assumed that the number of times of re-transmissions is decided to be two. Further, the UE 100 decides the number of times of re-transmissions of DATA 14, which is the next initial transmission data. Here, it is assumed that the number of times of re-transmissions is decided to be two.

Next, the UE 100 transmits the D2D communication data (DATA 11 through DATA 14) by using the four small resources. The UE 100 transmits a new data identifier (NDI) together with the initial transmission data or the retransmission data, by using each of the four small resources. Therefore, as shown in FIG. 11, the NDI exists as the control information accompanying the D2D communication data.

Here, the NDI indicates the switching from predetermined retransmission data to the next initial transmission data. In contrast to the fact that the DATA 13 is the retransmission data of the DATA 11, the DATA 14 is new initial transmission data. Thus, the NDI that is transmitted together with each of the DATA 11 through the DATA 13 indicates 0, and the NDI that is transmitted together with the DATA 14 indicates 1.

Therefore, a reception UE that receives the D2D communication data is capable of understanding that the DATA 12 and the DATA 13, that are transmitted together with the NDI indicating 0 that are same as the NDI indicating 0 that is transmitted together with the DATA 11, are the retransmission data. On the other hand, the reception UE is capable of understanding that the DATA 14 that is transmitted together with the NDI indicating 1 is the next initial transmission data.

The UE 100 transmits the initial transmission data by using the last small resource of the plurality of small resources of which the location is indicated by the scheduling assignment SA 1.

Next, the UE 100 transmits a scheduling assignment SA 2. Thereafter, in order to transmit the retransmission data of the DATA 14, the UE 100 uses the initial small resource of the plurality of small resources of which the location is indicated by the scheduling assignment SA 2, and transmits DATA 21, which is the retransmission data of the DATA 14. The NDI that is transmitted together with the DATA 21 indicates 1 same as the NDI that is transmitted together with the DATA 14.

Thus, according to the operation pattern 2, since the scheduling assignment and the number of times of re-transmissions are not associated, the UE 100 is capable of transmitting the retransmission data by using the initial small resource from among the plurality of small resources of which the location is indicated by one scheduling assignment. In other words, the UE 100 is capable of using the last small resource from among the plurality of small resources of which the location is indicated by one scheduling assignment in the initial transmission data or the retransmission data without taking into consideration the number of the plurality of small resources and the number of times of re-transmissions of the retransmission data. Therefore, it is possible to transmit the D2D communication data by using all of the plurality of small resources of which the location is indicated by one scheduling assignment, and as a result, it is possible to effectively use the radio resource.

Further, according to the operation pattern 2, since the UE that receives the D2D communication data is capable of determining whether the D2D communication data is initial transmission data or retransmission data on the basis of the NDI that is transmitted together with the D2 communication data, the UE is capable of appropriately understanding the initial transmission data and the retransmission data.

Next, specific methods of transmitting, by the UE 100, the D2D communication data and the NDI together will be described.

As a first method, as shown in FIG. 12, the UE 100 synthesizes the D2D communication data (Data) and the control information including the NDI (Control information) at a bit level. The UE 100 joins together and synthesizes a bit string of the D2D communication data and a bit string of the control information. Alternatively, the UE 100 may synthesize a bit string of the D2D communication data and a bit string of the control information according to a predetermined rule. The UE 100 saves the synthesized bit string in a resource element (RE) (the RE shown in white in FIG. 12) that is different from a resource element of DMRS (Data Demodulation Reference Signal) (the RE shown by slanted lines in FIG. 12). As a result, the D2D communication data and the NDI are transmitted.

As a second method, as shown in FIG. 13, the UE 100 maps the control information in a predetermined RE. As a result, the D2D communication data and the NDI are transmitted.

As a third method, the UE 100 decides a sequence of the DMRS by considering the sequence of the DMRS as the NDI. Specifically, the UE 100 changes the sequence of the DMRS when new initial transmission data is transmitted, and maintains the sequence of the DMRS when the retransmission data is transmitted. When the sequence of the DMRS is changed, the reception UE understands that the D2D communication data is the initial transmission data.

(Decision of the Number of Times of Re-Transmissions)

A method of deciding the number of times of re-transmissions of the retransmission data will be described, below.

Firstly, the UE 100 scans a SA allocation region, and receives a scheduling assignment from another UE. The UE 100 receives the D2D communication data from the another UE on the basis of the received scheduling assignment.

Secondly, the UE 100 decides the number of times of re-transmissions on the basis of the reception status of the D2D communication data from the another UE. Specifically, when the reception success rate (packet error rate) of the D2D communication data from the another UE is below a threshold value, the UE 100 decides a value larger than the number of times of re-transmissions of the retransmission data from the another UE as the number of times of re-transmissions of the retransmission data transmitted by the UE 100. On the other hand, when the reception success rate (packet error rate) of the D2D communication data is higher than the threshold value, the UE 100 decides a value lower than the number of times of re-transmissions of the retransmission data from the another UE as the number of times of re-transmissions of the retransmission data transmitted by the UE 100.

If the UE 100 is successful in performing reception without performing packet synthesis up to the maximum number of times of re-transmissions of the retransmission data from the another UE, the UE 100 may decide the number of times of re-transmissions of the retransmission data received until the successful reception as the number of times of re-transmissions of the retransmission data transmitted by the UE 100.

When the UE 100 receives the D2D communication data from a plurality of UEs, the UE 100 may compare a reception status of the D2D communication data having the worst reception status of the plurality of D2D communication data with the threshold value.

Further, the UE 100 may decide the MCS to be applied to the D2D communication data of the UE 100 on the basis of the reception success rate (packet error rate) of the D2D communication data from the another UE. Further, the UE 100 may decide the number of times of re-transmissions and the MCS on the basis of the MCS included in the scheduling assignment from the another UE.

For example, when the MCS to be applied to the D2D communication data of the UE 100 is not possible to be changed, the UE 100 decides the number of times of re-transmissions so that the reception success rate (packet error rate) of the D2D communication data reaches a desired value within a range not exceeding the maximum number of times of re-transmissions. Further, when the MCS to be applied to the D2D communication data of the UE 100 is variable, the UE 100 decides the MCS so that the number of times of re-transmissions reaches the desired value. The UE 100 may first decide the MCS and then decide the number of times of re-transmissions, or vice versa. Since the MCS is capable of finely controlling the quality than the the number of times of re-transmissions (HARQ frequency), it is preferable that the UE 100 first decides the number of times of re-transmissions, and then decides the MCS.

It is noted that the UE 100 decides the number of times of re-transmissions within a range in which the transmission throughput of the D2D communication data does not exceed the desired value.

[Other Embodiments]

In the described-above embodiment, although an LTE system is described as an example of a mobile communication system, it is not limited to the LTE system, and the present invention may be applied to a system other than the LTE system.

It is noted that the entire content of Japanese Patent Application No. 2014-059273 (filed on Mar. 20, 2014) is incorporated in the present specification by reference.

INDUSTRIAL APPLICABILITY

As described above, according to the embodiment-based communication control method and user terminal, when a transmission-side user terminal decides the number of times of re-transmissions of retransmission data independent of a feedback from a reception-side user terminal, the reception-side user terminal is capable of appropriately understanding initial transmission data and retransmission data, and therefore, the present invention is useful in the field of mobile communication.

The invention claimed is:

1. A communication control method, comprising:
   receiving, by a first user terminal, second communication data transmitted from a second user terminal by direct communication;
   deciding, by the first user terminal, a first number of times of retransmission, which is a number of times for transmission of retransmission data that is the same as an initial transmission data, on the basis of a comparison between a reception success rate of the second communication data and a threshold value;
   transmitting, by the first user terminal, a scheduling assignment indicating a location of a radio resource used in a reception of first communication data transmitted by the first user terminal by the direct communication; and
   transmitting, by the first user terminal, the first communication data including the initial transmission data and the retransmission data based on the first number of times of retransmission by using the radio resource, wherein
   the second communication data transmitted from the second user terminal includes initial transmission data and retransmission data transmitted from the second user terminal,
   in deciding the first number of times of retransmission, when the reception success rate of the second communication data is below the threshold value, the first user terminal decides a value larger than a second number of times of retransmission of the retransmission data transmitted from the second user terminal as the first number of times of retransmission, and
   in transmitting the first communication data, the user terminal transmits a new data identifier (NDI) with the retransmission data.

2. The communication control method according to claim 1, further comprising:
   deciding, by the first user terminal, a modulation and coding scheme to be applied to the first communication data on the basis of the reception success rate.

3. A first user terminal, comprising:
   a processor and a memory coupled to the processor, wherein the processor is configured to execute processes of:
   receiving second communication data transmitted from a second user terminal by direct communication;
   deciding a first number of times of retransmission, which is a number of times for transmission of retransmission data that is the same as an initial transmission data, on the basis of a comparison between a reception success rate of the second communication data and a threshold value;
   transmitting a scheduling assignment indicating a location of a radio resource used in a reception of first communication data transmitted by the first user terminal by the direct communication, and
   transmitting the first communication data including the initial transmission data and the retransmission data based on the first number of times of retransmission by using the radio resource, wherein
   the second communication data transmitted from the second user terminal includes initial transmission data and retransmission data transmitted from the second user terminal, in deciding the first number of times of retransmission, when the reception success rate of the second communication data is below the threshold value, the processor decides a value larger than a second number of times of retransmission of the retransmission data transmitted from the second user terminal as the first number of times of retransmission, and in transmitting the first communication data, the processor transmits a new data identifier (NDI) with the retransmission data.

* * * * *